Feb. 11, 1930. F. H. McLAIN 1,746,840
SHOCK ABSORBER FOR AUTOMOBILES
Filed Sept. 18, 1928
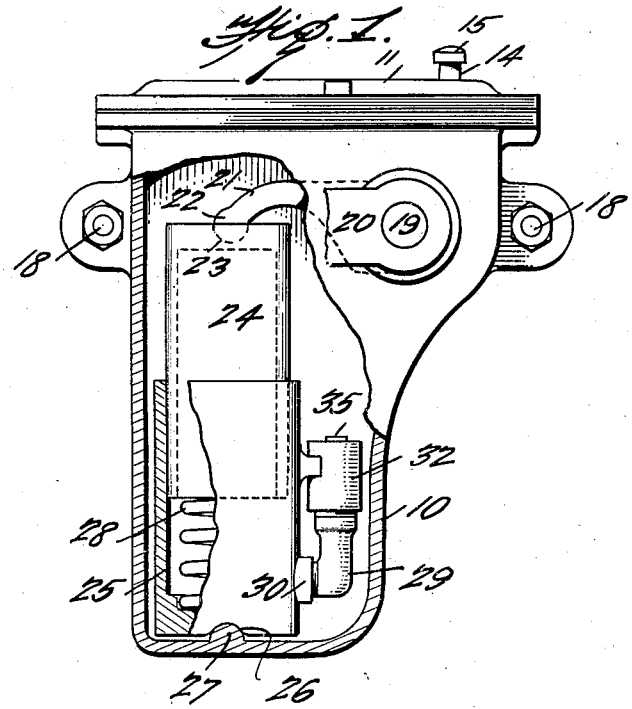
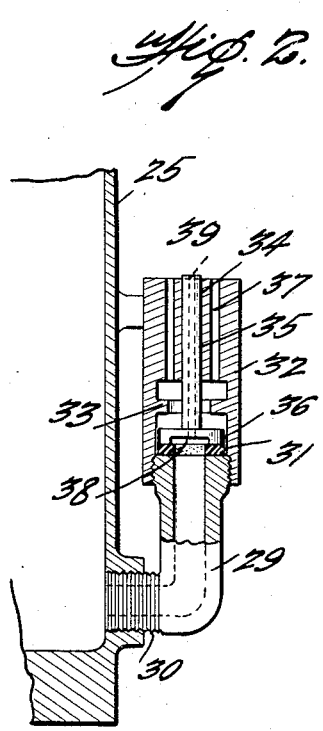
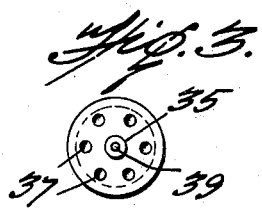
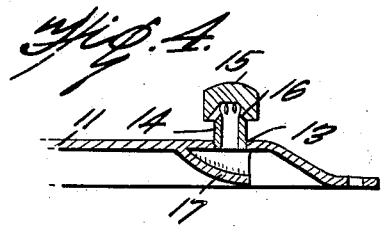
Inventor
Fremont H. McLain,
By Marks Appleman,
Attorney Patented Feb. 11, 1930

1,746,840

UNITED STATES PATENT OFFICE

FREMONT H. McLAIN, OF WELLSVILLE, OHIO

SHOCK ABSORBER FOR AUTOMOBILES

Application filed September 18, 1928. Serial No. 306,769.

This invention relates to shock absorbers for automobiles and the like, and has for an object the provision of novel means whereby the motion between the body and chassis of an automobile or the like is communicated to telescopically arranged elements of novel construction and assembly which include means for providing efficient lubrication of the shock absorber.

It is a further object of this invention to provide telescopic members adapted to move approximately vertically, and means whereby force is applied to the uppermost of said members in the center of its longitudinal axis and in a manner to prevent sidewise slap as force is applied against said uppermost member.

It is a still further object of this invention to provide a novel valve associated with one of the telescopic members through which fluid, such as oil, may be forced, and the said valve is so arranged that the flow of the fluid under the pressure of one of the telescopic members is retarded, as compared with the flow in the reverse direction when suction, due to the return of the telescopic member, draws the fluid into the zone of action of the said telescopic member.

It is furthermore an object of the invention to so arrange the parts that the oil ejected by the first mentioned movement of the telescopic member will be directed to the moving parts of the shock absorber within a housing for the assembly.

With the foregoing and other objects in view, the invention consists in the details of construction, and in the arrangement and combination of parts to be hereinafter more fully set forth and claimed.

In describing the invention in detail, reference will be had to the accompanying drawings forming part of this application, wherein like characters denote corresponding parts in the several views, and in which—

Figure 1 illustrates a view in elevation partly in section of a shock absorber embodying the invention;

Figure 2 illustrates an enlarged sectional view of a fragment of one of the telescopic members showing a valve attached thereto;

Figure 3 illustrates a plan view of the valve; and

Figure 4 illustrates a sectional view of a fragment of the cover showing a vent cap.

In these drawings, 10 denotes a housing having a removable cover 11 and the said cover has an aperture 13 in which a vent tube 14 is secured in any appropriate way. The tube has a cap 15 with vent ports 16 in order that air within the housing will be at atmospheric pressure as the device operates. The cover has a depending and longitudinally extending shield 17 which underlies the vent tube and prevents oil or the resistance fluid of the absorber from splashing into the tube.

The housing may be anchored to a side frame of an automobile, or to such other part as may be desired, through the employment of fastenings 18, such as bolts, and a shaft 19 is journaled transversely of the housing and it projects at one side thereof. An arm 20 is secured on the shaft 19 externally of the housing and it is intended to be oscillated as movement occurs between the chassis and the axle of an automobile, as is well known. Means for imparting movement to arms of this character are well known and need not, it is thought, be shown or described in detail.

Within the housing a curved arm 21 is secured on the shaft 19 and it has a round or camming end 22 which lies in a seat 23 of the telescopic member 24, which telescopic member acts as a piston within a cup-shaped member 25. The member 25 has a seat 26 in its bottom that receives a rib 27 on the inner bottom wall of the housing and said rib constitutes a fulcrum on which the member 25 oscillates as the arm 21 moves to force the member 24 into the cup. A spring 28 bears against the bottom of the cup and extends upwardly into the telescopic member 24 and it is effective to force the member 24 or retract when pressure of the arm 21 is released.

A fluid circulating pipe 29 has a nipple 30 threaded in the wall of the cup near the bottom thereof and, as has been stated, the fluid to be employed is preferably oil. The upper end of the pipe 29 is engaged by a fibrous washer 31 and a valve casing 32 is secured to the upper end of the pipe and it embraces said washer.

The valve casing has an apertured valve seat 33 in its interior and a central bore 34 in which the stem 35 of the valve 36 is slidable. The valve stem projects through the aperture of the valve seat and the valve thereon coacts with the valve seat to prevent the flow of fluid outwardly through the aperture of the valve seat. The valve casing is further provided with one or more ducts or apertures 37 through which fluid may be drawn into the cup through the pipe 29, due to suction, as the telescopic member 24 moves under the influence of the spring 28. There is a clearance between the periphery of the valve and the inner wall of the valve casing, and the lower face of the valve is provided with one or more channels, such as 38, and, therefore, as oil is drawn through the ports and the valve is in the position in which it is shown in Figure 2, the said oil will pass the side of the valve and reach the pipe 29 through the channel 38. The valve stem has a central bore or duct 39 and when the oil is under compression the valve will be forced to its seat, thus preventing the flow of fluid through the aperture of the valve seat, but oil will escape through the valve stem and be under pressure which would drive the oil to the top of the case where it will be sprayed or drip over the working parts for the purpose of lubricating the same.

I claim:

1. In a shock absorber, a casing adapted for containing oil, elements slidably mounted with relation to each other and operative to compress oil, a spring interposed between the elements, means by which the lowermost element is oscillatably mounted in the casing, an arm engaging the uppermost element, means for imparting oscillatory movement to said arm, an oil duct connected to the lower telescopic element, a valve casing communicating with the duct, said valve casing having a valve seat with an opening therein and ports thereabove, a valve coacting with the valve seat having a hollow stem slidable in the valve casing and adapted to discharge oil at the end of the valve stem remote from the valve, the said valve having channels in its lower face and the said valve being of less diameter than the diameter of that part of the valve casing in which it is operative, whereby oil passing into the ports of the valve casing may flow past the valve into the oil duct.

2. In a shock absorber, a casing adapted for containing oil, elements slidably mounted one in the other therein, means for oscillatably supporting one of the elements, means for exerting pressure inwardly on the other of said elements, means between the elements tending to force them apart, means for communicating motion of separate parts of an automobile to the means for pressing the element inwardly, a fluid pipe communicating with one of the elements, a valve casing on said pipe, an apertured valve seat in the valve casing, a valve coacting with the valve seat and the end of the pipe, the said valve being of less diameter than the valve chamber in which it operates, the said valve having a channel in its under surface, a valve stem connected to the valve and having a port therethrough, the said valve stem being slidable in the casing, and the said casing having ports for the passage of oil inwardly through the opening in the valve seat when the valve disengages its seat.

3. In a shock absorber, a casing adapted for containing oil, elements slidably mounted one in the other therein, means for oscillatably supporting one of the elements, a member engaging the other element for forcing the elements toward each other, an expansible member between the elements tending to force them apart, means by which moving parts of an automobile operate the said means for forcing the elements together, a pipe connected to the interior of one of the elements, a valve casing on the pipe, a washer on the end of the pipe within the valve casing, an apertured valve seat in the valve casing in spaced relation to the washer, a valve of less diameter than the bore of the valve casing operative in the space between the valve seat and the washer, the said valve having a channel in the surface next to the washer, an apertured valve stem associated with the valve and communicating with an aperture in the valve, the said valve casing having a passage in which the valve stem is slidable, the said valve casing having oil passages above the valve seat through which oil enters the valve casing when the valve is unseated.

FREMONT H. McLAIN.